June 21, 1960 W. STELZER 2,941,844
TRACTOR-TRAILER BRAKE SYSTEM
Filed April 7, 1958
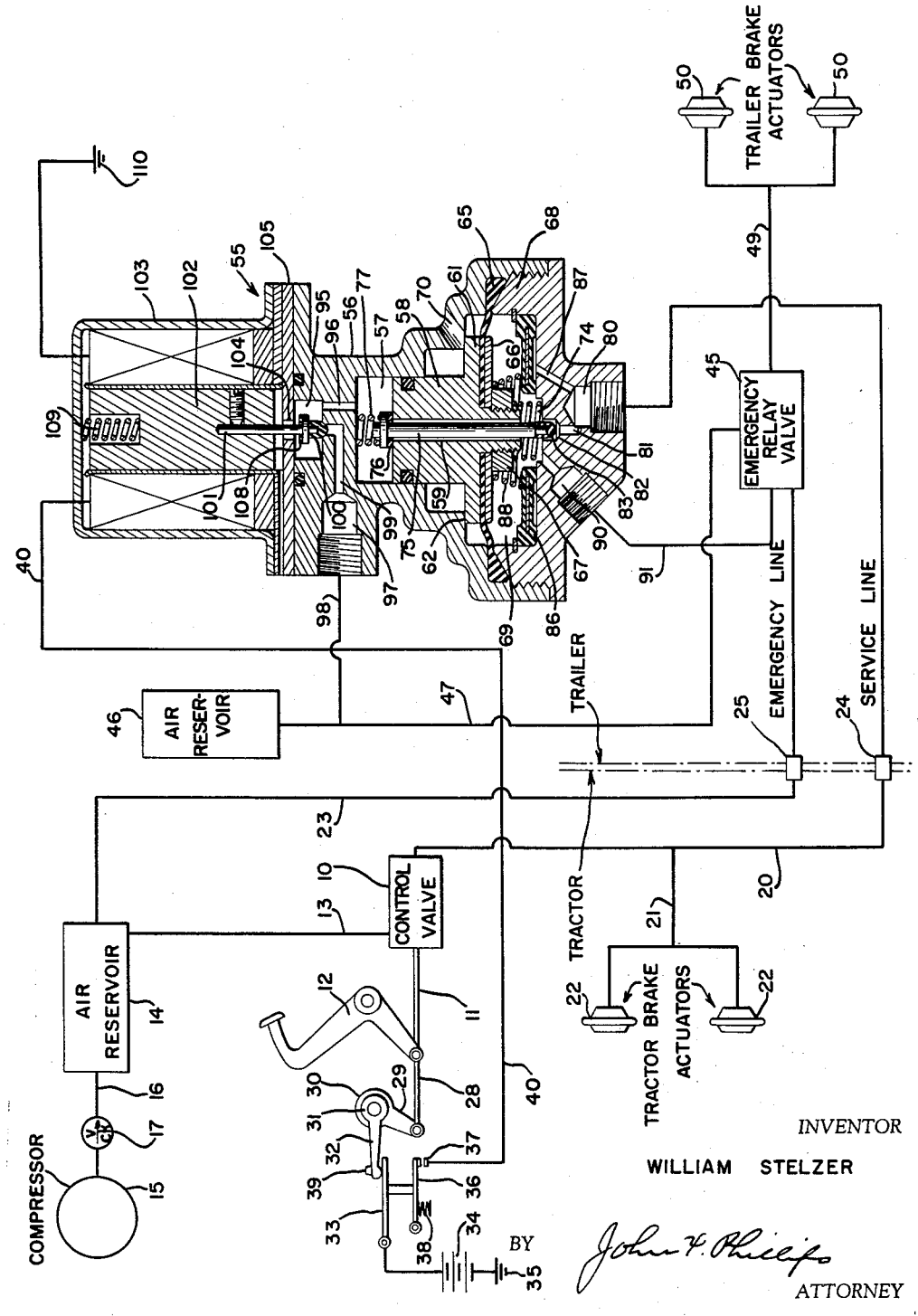
INVENTOR
WILLIAM STELZER
ATTORNEY United States Patent Office 2,941,844
Patented June 21, 1960

2,941,844
TRACTOR-TRAILER BRAKE SYSTEM

William Stelzer, Bloomfield Hills, Mich., assignor to Kelsey-Hayes Company, Detroit, Mich., a corporation of Delaware Filed Apr. 7, 1958, Ser. No. 726,666

13 Claims. (Cl. 303—7)

This invention relates to a tractor-trailer brake system.

It is a common practice in tractor-trailer brake systems to provide the trailer with an emergency relay valve subject to operation upon operation of the truck brake system for connecting the trailer brake actuators to a source of fluid pressure to apply the trailer brakes. Because of the length of the service line between the tractor brake control means and the emergency relay valve, there is a time lag between the operation of the truck brakes and trailer brakes. This lag can be quite dangerous and can cause the tractor-trailer to "jackknife." Accordingly, it is the usual practice to provide the tractor with a hand control valve, operable by the driver, to effect the operation of the trailer brake actuators ahead of the operation of the truck brakes, thus preventing "jackknifing."

An important object of the present invention is to provide a novel automatic control valve means operable upon initial movement of the truck brake pedal for transmitting pressure to the emergency relay valve to supply fluid pressure to the trailer brake actuators without awaiting the pressure impulse in the service line necessary for this purpose, thus eliminating any lagging in the operation of the trailer brakes but causing such brakes to operate simultaneously with, or slightly ahead of, the truck brakes.

A further object is to provide a system of this character wherein the automatic valve functions in the manner referred to and is subject to control by pressures in the service line so that such pressures, when built up to a predetermined extent in a super-atmospheric brake system, render the automatic control valve inoperative and take over the controlling of the emergency relay valve so as to effect a trailer brake operation proportionate to the application of the truck brakes.

A further object is to provide a system of this character wherein initial movement of the truck brake pedal energizes a solenoid to operate a valve mechanism to supply pressure from an air reservoir in the tractor to the relay valve to effect trailer brake operation simultaneously with or slightly ahead of operation of the truck brakes, and to provide means operative by pressures in the service line for rendering the solenoid control valve mechanism inoperative when pressures in the service line are ready to take over the controlling of the emergency relay valve for supplying braking pressures to the trailer brake actuators.

Other objects and advantages of the invention will become apparent during the course of the following description.

In the drawing I have shown one embodiment of the invention. In this showing:

The figure is a diagrammatic showing of the tractor-trailer brake system, the automatic valve mechanism being structurally shown in axial section.

Referring to the drawing, there is illustrated a tractor-trailer brake system of the super-atmospheric pressure type. A control valve mechanism 10 is connected as at 11 to a conventional truck brake pedal 12 to apply the truck brakes. The valve mechanism 10 is connected by a line 13 to an air reservoir 14 supplied with air under pressure from a compressor 15 through a line 16 in which is arranged a check valve 17.

From the control valve 10 extends a service line 20 having branch lines 21 extending to the air pressure operated truck brake actuators 22. The usual emergency line 23 also is connected to the air reservoir, and the lines 20 and 23 extend rearwardly to the trailer through conventional connectors 24 and 25.

The brake pedal 12 is also connected through a rod 28 to an arm 29 having a disk 30 at its upper end frictionally engaging a disk 31 having an operating arm 32 projecting therefrom. The arm 32 engages a pivoted switch operating arm 33 shown as being connected to one side of a source of current 34, the second terminal of which is grounded as at 35. The arm 33 transmits force to a switch arm 36 engageable with, but normally disengaged from, a contact 37, the switch arm 36 being biased to open position by a spring 38. Movement of the switch arm 32 upwardly by the spring 38 is limited by a stop 39. The switch mechanism forms per se no part of the present invention and may be of the type shown in the prior patent to Jeannot G. Ingres, No. 2,571,885, granted October 16, 1951. The contact 37 is connected to one end of a wire 40 leading rearwardly to the trailer and further described below.

The trailer is provided with a conventional emergency relay valve 45 connected to a trailer air reservoir 46 by a pipe line 47. The emergency relay valve is connected by lines 49 to the trailer brake actuators 50 of conventional type. The emergency line 23 is connected to the emergency relay valve in the usual manner and is always under pressure from the reservoir 14 to render the emergency relay valve operative solely under the control of the braking system except in the event of a break-away of the trailer from the tractor. In the latter case, the drop in pressure in the emergency line operates the valve mechanism 45 to supply fluid pressure to the trailer brake actuators to set the brakes in accordance with conventional practice.

An automatic valve mechanism forming the principal subject matter of the present invention is indicated as a whole by the numeral 55. This valve mechanism comprises a preferably cast body 56 having a cylinder bore 57 therein in which is axially movable a sealed plunger 58 having an axial passage 59 therethrough. The lower end of the plunger 58 is provided with an outstanding flange 61 normally occupying the position shown in the drawing in engagement with a shoulder 62 carried by the body 56.

A diaphragm 65 is clamped to the bottom of the plunger 58 by a plate 66 maintained in position by a nut 67. The peripheral portion of the diaphragm is clamped with respect to the body 56 by a lower cap 68 threaded into the body 56. This cap forms with the diaphragm 65 and associated elements a chamber 69 in constant communication with the lower end of the axial passage 59. The space above the diaphragm 65 and around the plunger 58 above the flange 61 is vented to the atmosphere as at 70.

A spring 74 engages the bottom wall of the cap 68 and has its upper end engaging the nut 67 to bias the plunger 58 to the normal position shown. A stem 75 extends loosely through the passage 59 and is provided at its upper end with a resilient valve 76 normally closing the upper end of the passage 59 from the chamber 57. A spring 77 biases the valve 76 to closed position, which position it normally occupies.

The bottom of the cap 68 is provided with a port 80 to which the service line 20 is connected. This port communicates through a passage 81, via a valve seat 82, with the chamber 69, and such valve seat is engageable and adapted to be closed by a resilient valve 83 carried by the lower end of the stem 75.

A check valve 86 is arranged in the bottom of the chamber 69 and has an inner down-turned flange portion engaging the bottom wall of the cap 68. Radially outwardly of such flange, a passage 87 communicates with the port 80 so that the bottom of the check valve 86 is always subject to any pressure present in the service line 24. The check valve 86 is in the form of a stiffened diaphragm and is biased to the closed position shown by a spring 88.

The chamber 69 communicates through a port 90 with one end of a line 91 leading to the emergency relay valve 45. The service line 20 normally is connected to the emergency relay valve 45 at the point of connection therewith of the line 91. It will be apparent that the ports 80 and 90 and associated elements are arranged in series with the service line.

In the top of the body 56 is formed a chamber 95 communicating through a passage 96 with the chamber 57. The body 56 is provided with a port 97 connected by a line 98 with the pressure line 47. A passage 99 leads from the port 97 to the chamber 95 and is normally closed by a resilient valve 100 carried by a stem 101. This stem is carried by the armature 102 of a solenoid 103, and the armature has an atmospheric space thereabove normally communicating with the chamber 95 through a passage 104 surrounding and of larger diameter than the stem 101. The port 104 is formed in a closure plate 105 the bottom of which, around the port 104, forms a valve seat engageable by a normally open resilient valve 108 carried by the stem 101. The armature 102 is biased downwardly by a spring 109.

The wire 40 is connected to one terminal of the solenoid 103 and the other terminal of this solenoid is grounded as at 110. It will be apparent that upon the closing of the switch 36, the solenoid 103 functions to move the armature 102 upwardly.

Operation

The parts normally occupy the positions shown in the drawing. When the brakes are to be operated, the pedal 12 is depressed and the control valve 10 functions to supply air pressure from the reservoir 14 through pipes 13, 20 and 21 to the truck brake actuators 22. Operation of the pedal rotates the disk 30 and through frictional connection of such disk with the disk 31, motion will be transmitted through the arms 32 and 33 to the switch 36 to close the latter. This switch is closed upon the first increment of movement of the brake pedal, whereupon movement of the arm 32 stops and the frictional engagement between the disks 30 and 31 permits the brake pedal to be moved as far as desired.

Immediately upon the closing of the switch 36, the solenoid 103 will be energized as stated above. The armature 102 will move upwardly, thus closing the valve 108 and opening the valve 100. The chamber 95, normally communicating with the atmosphere through port 104, will be cut off from such communication, and air pressure from the reservoir 46 will flow through line 98, passage 99, chamber 95 and passage 96 into the chamber 57. This pressure acts on the upper end of the plunger 58 exposed to the chamber 57, thus moving this plunger downwardly. Such movement of the plunger 58 continues beyond the point at which the valve 83 will be closed by the spring 77 and, accordingly, the valve 76 will be supported in open position.

Under such conditions, air under pressure will flow from chamber 57 through passage 59 into the chamber 69 and thence through port 90 and line 91 to the emergency relay valve mechanism which operates conventionally to supply air under pressure from the reservoir 46 through lines 47 and 49 to the trailer brake actuators 50.

It will be noted that this application of the trailer brakes takes place almost instantly upon the closing of the switch 36 and the trailer brakes will be set simultaneously with, or slightly ahead of, the operation of the truck brake actuators 22 upon movement of the pedal 12 beyond the point at which the switch 36 is closed.

Thus it will be apparent that air pressure is supplied from the reservoir 46 to the emergency relay valve 45 to operate the trailer brake actuators 50 regardless of any time lag in the building-up of pressure in the rear end of the service line 20. When such pressure builds up to a predetermined point, it will act through passage 87 to open the check valve 86 and thus supply service line pressure to the chamber 69. This action will occur as soon as service line pressure exceeds pressure in the chamber 69 together with the slight downward force exerted by the spring 88.

It will be apparent, therefore, that the building-up of pressure in the rear end of the service line will supply pressure to the chamber 69 and such pressure, acting on the bottom of the diaphragm 65, will move the plunger 58 upwardly to its normal position, seating the valve 76 to disconnect the chambers 57 and 69 and unseating the valve 83 for the flow of service line pressure through passage 81 into the chamber 69 and thus to the line 91. Whenever pressure in the rear end of the service line reaches the desired point, therefore, such pressure renders the automatic control valve 55 inoperative and takes over the controlling of the emergency relay valve 45. From such point on, therefore, the trailer brakes will be applied to an extent proportional to application of the truck brakes. The solenoid 103 will remain energized to supply air pressure to the chamber 57, but such pressure cannot flow to the chamber 69 and higher pressures in the latter chamber cannot flow to the chamber 57 since the valve 76 will be held in closed position.

The maximum pressure which can be supplied to the chamber 69 by operation of the control valve mechanism 55 is controlled by structural features of the valve mechanism. If during initial brake operation, pressure admitted to the chamber 69 from the chamber 57 becomes too high, such pressure will act on the diaphragm 65 to raise the plunger 58, close the valve 76 and open the valve 83 to relieve excess pressure from the chamber 69 into the service line 20 so long as pressure in the latter is lower than pressure in the chamber 69. The present device, therefore, functions to control maximum pressures in the chamber 69, and thus pressures supplied to the emergency relay valve 45 through line 91 until the functioning of the device is taken over by pressures in the service line 20.

From the foregoing, it will be apparent that the present device, which is quite simple in construction, permits the elimination of the conventional hand control valve in the cab of the truck and assures application of the trailer brakes at least as early as application of the truck brakes. Thus "jackknifing" is prevented, and the valve mechanism 55 therefore constitutes an important safety device on the trailer. Moreover, it will be apparent that if only a slight snubbing action of the brakes is needed, the operator can slightly depress the pedal 12 to close the switch 36 and thus supply pressure through the line 91 to the emergency valve 45 to operate the trailer brake actuators 50. The closing of the switch 36 preferably takes place prior to any operation of the truck brake actuators 22, and accordingly the operator can utilize initial slight movement of the brake pedal to apply the tractor brakes without applying the truck brakes.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a tractor-trailer brake system, control means on the tractor operable for supplying fluid pressure to actuators for the tractor brakes, a manual control element for said control means having a normal position in which the tractor brake actuators are de-activated, a relay valve on the trailer having connection with a fluid pressure source and with actuators for the trailer brakes and normally inoperative for activating the trailer brake actuators, a service line connected at one end to said control means and at its other end to said relay valve, and an automatic valve mechanism on the trailer connected in said service line between said ends thereof, said valve mechanism comprising an automatic control device operative upon initial movement of said manual control element from said normal position for supplying pressure from said source to said other end of said service line and to said relay valve to activate the trailer brake actuators, and means subject to pressure in said service line adjacent said automatic valve mechanism and operative when such pressure reaches a predetermined point for rendering said automatic control device inoperative for supplying pressure to said other end of said service line and for connecting said ends of said service line to each other.

2. A system according to claim 1 wherein said automatic control device comprises a normally engaged valve and valve seat closing communication between said source and said relay valve, a solenoid having a circuit including a normally open switch connected to be closed upon initial movement of said manual control element to energize said solenoid, and means operable upon energization of said solenoid for effecting separation of said valve and valve seat to connect said other end of said service line to said source.

3. In a tractor-trailer brake system, control means on the tractor operable for supplying fluid pressure to actuators for the tractor brakes, a manual control element for said control means having a normal position in which the tractor brake actuators are de-activated, a relay valve on the trailer having connection with a fluid pressure source and with actuators for the trailer brakes and normally inoperative for activating the trailer brake actuators, a service line connected at one end to said control means and at its other end to said relay valve, and an automatic valve mechanism on the trailer connected in said service line between said ends thereof, said valve mechanism comprising a chamber communicating with said other end of said service line, automatic control means operative upon initial movement of said manual control element from said normal position for supplying pressure from said source to said chamber, and means exposed to pressure in said service line adjacent said automatic valve mechanism to be operated when such pressure increases to a predetermined point for disconnecting said chamber from said source and connecting it to said other end of said service line.

4. A system according to claim 3 wherein said automatic control means comprises a normally engaged valve and valve seat closing communication between said chamber and said source, a solenoid having a circuit including a normally open switch connected to be closed upon initial movement of said manual control element, and means operative when said solenoid is energized for separating said valve and valve seat to connect said chamber to said source.

5. In a tractor-trailer brake system, control means on the tractor operable for supplying fluid pressure to actuators for the tractor brakes, a manual control element for said control means having a normal position in which the tractor brake actuators are de-activated, a relay valve on the trailer having connection with a fluid pressure source and with actuators for the trailer brakes and normally inoperative for activating the trailer brake actuators, a service line connected at one end to said control means and at its other end to said relay valve, and an automatic valve mechanism on the trailer connected in said service line between said ends thereof, said valve mechanism comprising a chamber communicating with said other end of said service line, means connected to be operated upon initial movement of said manual control element from normal position for connecting said chamber to said source, pressure responsive means exposed to pressure in said chamber for closing communication between said chamber and said source when pressure in said chamber reaches a predetermined point, and means subject to operation by pressure in said service line adjacent said automatic valve mechanism for connecting it to said chamber when pressure in said one end of said service line is higher than pressure in said chamber.

6. In a tractor-trailer brake system, control means on the tractor operable for supplying fluid pressure to actuators for the tractor brakes, a manual control element for said control means having a normal position in which the tractor brake actuators are de-activated, a relay valve on the trailer having connection with a fluid pressure source and with actuators for the trailer brakes and normally inoperative for activating the trailer brake actuators, a service line connected at one end to said control means and at its other end to said relay valve, and an automatic valve mechanism connected in said service line between said ends thereof, said valve mechanism comprising a body having a first chamber therein communicating with said other end of said service line, a first pressure responsive device exposed to pressure in said first chamber, a second chamber, a second pressure responsive device exposed to pressure in said second chamber and connected to said first pressure responsive device, means connected to be operated upon initial movement of said manual control element from said normal position to connect said source to said second chamber to move said second pressure responsive device, means operable upon movement of said second pressure responsive device for connecting said first chamber to said second chamber to supply pressure to said other end of said service line, and means subject to operation by pressure in said one end of said service line for connecting the latter to said first chamber to move said first pressure responsive member to cut off communication between said first and second chambers and to connect said first chamber to said one end of said service line.

7. A system according to claim 6 wherein said means subject to operation by pressure in said one end of said service line comprises a normally closed check valve in said first chamber controlling communication between said one end of said service line and said first chamber, said check valve closing toward said one end of said service line.

8. A system according to claim 6 wherein said means connected to be operated upon initial movement of said manual control element comprises a solenoid having a circuit including a normally open switch connected to be closed upon initial movement of said manual control element from said normal position, and a normally closed valve connected to be operated upon energization of said solenoid for connecting said second chamber to said source.

9. In a tractor-trailer brake system, control means on the tractor operable for supplying fluid pressure to actuators for the tractor brakes, a manual control element for said control means having a normal position in which the tractor brake actuators are deactivated, a relay valve on the trailer having connection with a fluid pressure source and with actuators for the trailer brakes and normally inoperative for activating the trailer brake actuators, a service line connected at one end to said control means and at its other end to said relay valve, and an automatic valve mechanism connected in said service line between said ends thereof, said valve mechanism comprising a body having a first chamber therein communicating with said other end of said service line, a first pressure responsive device exposed to pressure in said first chamber, a second chamber, a second pressure responsive device exposed to pressure in said second chamber and connected to said first pressure responsive device, said pressure responsive devices having a passage therethrough communicating between said chambers, the end of said passage adjacent said second chamber forming a valve seat, a valve normally engaging said seat, said valve having limited movement in the direction of movement of said second pressure responsive device when the latter is moved by pressure in said second chamber whereby said seat moves away from said valve to connect said chambers, and means subject to operation by pressure in said one end of said service line for connecting the latter to said first chamber to move said first pressure responsive device to move said seat into engagement with said valve and to connect said first chamber to said one end of said service line.

10. A system according to claim 9 wherein said means subject to operation by pressure in said one end of said service line comprises a second passage in said body communicating between said one end of said service line and said first chamber, and a normally closed check valve in said first chamber subject to pressure in said second passage to open said check valve when pressure in such passage is higher than pressure in said first chamber.

11. A system according to claim 9 wherein said second pressure responsive device comprises a plunger through which said passage extends, a stem extending loosely through said passage and carrying said valve in said second chamber, said body having a valve seat between said first chamber and said one end of said service line, and a valve carried by said stem in said first chamber and engageable with said last-named valve seat and movable therefrom by engagement of said plunger with said first-named valve.

12. A system according to claim 9 wherein said second pressure responsive device comprises a plunger through which said passage extends, a stem extending loosely through said passage and carrying said valve in said second chamber, said body having a valve seat between said first chamber and said one end of said service line, a valve carried by said stem in said first chamber and engageable with said last-named valve seat and movable therefrom by engagement of said plunger with said first-named valve, said means subject to operation by pressure in said one end of said service line comprising a second passage in said body communicating between said one end of said service line and said first chamber, and a normally closed check valve in said first chamber subject to pressure in said second passage to open said check valve when pressure in such passage is higher than pressure in said first chamber.

13. A system according to claim 9 wherein said second pressure responsive device comprises a plunger and said first pressure responsive device comprises a diaphragm connected between said plunger and said body, the effective area of said diaphragm exposed to said first chamber being greater than the effective area of said plunger exposed to said second chamber whereby pressure in said first chamber will move said valve seat into engagement with said valve to close communication between said chambers to limit the pressure supplied to said first chamber from said source to a pressure below the pressure of said source.

References Cited in the file of this patent
UNITED STATES PATENTS

| | | |
|---|---|---|
| 2,035,305 | Eaton | Mar. 24, 1936 |
| 2,434,050 | Price | Jan. 6, 1948 |